Patented Oct. 17, 1944

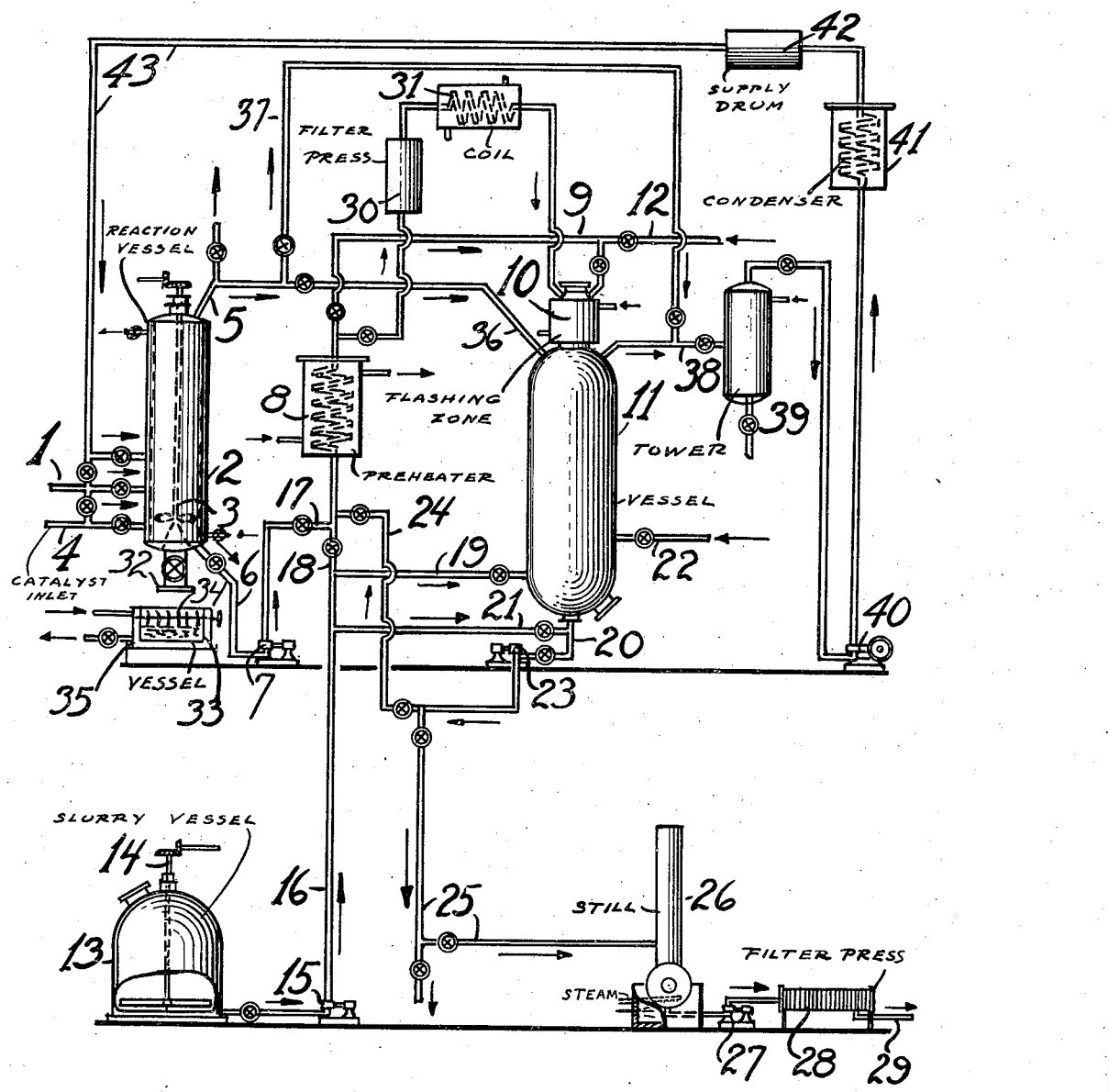

2,360,632

UNITED STATES PATENT OFFICE 2,360,632

PROCESS FOR PREPARING POLYMERS OF HIGH MOLECULAR WEIGHT

Matthew D. Mann, Jr., Roselle, and Luther B. Turner, Elizabeth, N. J., assignors, by mesne assignments, to Jasco, Incorporated, a corporation of Louisiana Application January 7, 1939, Serial No. 249,682

26 Claims. (Cl. 260—683.15)

The present invention relates to an improved process for producing polymers of high molecular weight, more particularly to the preparation of high quality hydrocarbon polymers of the linear or chain type from isobutylene and other iso-olefins.

It is known that iso-olefins, especially isobutylene, can be polymerized to high molecular weight products which have a thickly viscous to solid consistency. These materials are of the linear chain type and are non-asphaltic, by which is meant that the polymerization is accomplished without gradual or continual loss of hydrogen and ring formation. Such polymers contain substantially the same ratio of hydrogen to carbon as the starting materials from which they are prepared. For example, the isobutylene polymer has the same ratio of hydrogen to carbon as does isobutylene itself. These high molecular weight polymers, as is well known, are prepared by polymerization of the iso-olefins, isobutylene in particular, at low temperatures, for example below —10° F. and preferably below —20° F. and even —60° F. or lower, while in the liquid phase with polymerization catalysts such as the well known Friedel-Crafts type metal halide catalysts, notably aluminum chloride, zinc chloride, titanium tetrachloride, boron fluoride and similar halides.

The polymers prepared by the above methods often are rather dark in color or develop color rapidly on heating. They may also be unstable and may decrease substantially in average molecular weight during the usual finishing and drying operations. Also in continuous processes the yield and molecular weight of the polymer product decreases substantially below that of the products initially obtained.

An improved process has now been found by which these disadvantages are greatly lessened, in many cases are completely avoided, and improved polymerization products are obtained. The invention will be fully understood from the following description and the accompanying drawing.

The drawing is a diagrammatic sketch in partial sectional elevation of an apparatus suitable for carrying out several modifications of the process of this invention and indicates the flow of materials.

A suitable iso-olefin, such as isobutylene, is supplied by line 1 to reaction vessel 2, which is designed to withstand pressure, is heavily insulated against transfer of heat and is provided with a stirrer 3. An inert solvent for the isobutylene polymer, such as butane, may also be added and is preferably used in sufficient amount to provide a total reaction mixture of such low viscosity that it may be readily pumped. The reaction vessel is chilled with a suitable refrigerant, such as liquid ethane, propane or carbon dioxide, which is preferably added directly to the reaction vessel in direct contact with the reacting materials therein. When the temperature of the reaction vessel is sufficiently low, preferably about —70° F., a small amount of a suitable catalyst, such as boron fluoride, is added by line 4, preferably in a slow continuous stream in admixture with additional refrigerant which serves to maintain a constant low reaction temperature of about —70° F. by taking up the heat of reaction. Vaporized refrigerants which may contain some isobutylene and volatile catalyst are withdrawn by line 5. When the reaction is substantially completed, the admission of catalyst is stopped and the liquid reaction mixture is withdrawn by line 6 and is forced by pump 7 through a steam preheater 8, in which it is heated to a temperature substantially above the vaporization temperature of the solvent, for example, to about 160° F. The preheated mixture is then passed by line 9 into a steam-jacketed flashing zone 10 of a vessel 11 which is maintained at a low pressure, suitably atmospheric. Live steam may also be supplied to the flashing zone by line 12.

A suitable alkali, such as lime, preferably CaO or calcium hydroxide, is made into a slurry in vessel 13, provided with stirrer 14, with a liquid vehicle such as butane, water or a normally liquid hydrocarbon oil boiling preferably above the temperature used in the flashing operation. This slurry is forced by pump 15 and line 16 into admixture with the reaction products of vessel 2 before the temperature of the reaction products is permitted to rise above about 0 to —10° F. The slurry may be passed directly into line 17 by line 18, or it may be passed into vessel 11 by line 19 or into line 20 by line 21.

If it is desired to remove the lime and any other solid materials from the mixture in line 9, this mixture may be passed through filter press 30 and then, with or without further heating of the filtrate, in coil 31, into the flashing zone 10. This type of operation is preferred when the unvaporized materials in vessel 11 are to be withdrawn therefrom in a highly viscous state, and when there is no recirculation from the flashing zone through the preheaters.

A suitable solvent oil may be supplied to vessel 11 by line 22 in sufficient amount to provide a solution of the polymer product of such low viscosity that it can be readily pumped. The resulting solution is withdrawn by line 20 and pump 23 and may be recycled to the preheating and flashing operation by line 24, or passed by line 25 to storage or to any suitable equipment for further treating and finishing. For example, it may be passed to still 26 in which it is stripped of any remaining traces of volatile material which would lower the flash point of the blending oil supplied by line 22, and then passed by pump 27 to filter press 28 in which any insoluble impurities, suspended alkali and the like, are removed. The finished product is then passed to storage (not shown) by line 29.

While the process illustrated in the drawing involves a continuous or semi-continuous treatment of the polymerization products, it is to be understood that this invention may also be applied to strictly batch operation. For example, the alkali may be added directly to the reaction vessel 2 when the reaction therein has proceeded to any desired extent, and may be mixed therein directly with the reaction products by means of the mixer 3. If operation to produce extremely high molecular weight polymers is desired in the absence of diluents, the stirrer 3 may be replaced by a more rugged and positive acting kneading device in order to insure thorough mixture of the alkali with the viscous reaction products.

In this event, the highly viscous reaction products may be withdrawn through the manhole 32 and dropped into a vessel 33, which is equipped with a rugged kneading device 34 and a jacket 35 for heating with steam. The alkali may then be added to the reaction products as soon as they are dropped into vessel 33. Any desired mixing and working operations can also be carried out in this vessel.

The vapors leaving vessel 2 by line 5 may be passed directly to the atmosphere or to any suitable system for recovery and separation of their components. In the case of continuous operation, it is convenient to pass the vapors by line 36 into the vessel 11 or by line 37 into the vapor draw-off line 38 from vessel 11. These vapors may be washed with aqueous alkali to remove any residual catalyst and catalyst derivatives in tower 39, and may then be liquefied by compressor 40 and condenser 41 and returned to the reaction vessel by means of a supply drum 42 and line 43. If it is found desirable, the vapors may also be passed through suitable fractionation equipment (not shown) to remove materials of substantially higher boiling point than the isobutylene.

The following examples are presented to illustrated suitable methods for carrying out the process of this invention.

*Example I*

400 gallons of liquid butane and 200 gallons of isobutylene are supplied in liquid state to a reaction vessel and are chilled by direct contact with carbon dioxide, released from a high pressure drum of liquid carbon dioxide, to a temperature of −70° F. The admission of carbon dioxide is continued at a sufficient rate to hold the temperature of the reaction vessel at −70° F. and a small amount of boron fluoride is supplied simultaneously in admixture with the carbon dioxide. A rapid polymerization reaction immediately ensues and the viscosity of the mixture in the reaction vessel increases markedly. When the reaction is substantially completed, as evidenced by no further increase in viscosity of the reaction mixture, this mixture is withdrawn from the reaction vessel and mixed while still cold with a slurry of lime in a petroleum lubricating oil having a viscosity of about 50 seconds Saybolt at 210° F., in an amount of about 500 lbs. of lime per thousand gallons of the isobutylene polymer. The resulting mixture with the lime oil slurry is then passed through a steam preheater in which it is heated to a temperature of about 160° F. and is then passed, with the release of pressure, into a flash still wherein vapors of butane, carbon dioxide and any boron fluoride, unreacted isobutylene and low molecular weight polymerization products present are released and separated from the liquid products. Live steam is continually supplied to the flashing zone in sufficient amount to maintain a temperature of about 160 to 170° F. in the flash still. About 1000 gallons of a refined petroleum lubricating oil having a viscosity of about 50 seconds Saybolt at 210° F. are supplied to this flash still to dissolve the isobutylene polymer therein. The resulting solution is withdrawn from the flash still and, preferably after repassing one or more times through the steam preheater, is stripped with steam and then passed through a filter press to remove any suspended solids. There is thus obtained a clear lubricating oil solution containing about 20 to 25% of an isobutylene polymerization product having an average molecular weight of about 15,000. This molecular weight corresponds to a tetraline number of 6 to 7.

The butane and isobutylene vapors leaving the flashing still are scrubbed with aqueous alkali, liquefied by compression, dried and recycled to the initial reaction vessel.

When operating continuously in the manner described above, a high quality isobutylene polymer having a tetraline number of 6 to 7 (15,000 average molecular weight) is produced continuously. The same operation, except omitting the addition of lime, produces a much lower quality isobutylene polymer product having a tetraline number of 3 to 4 (10,000 average molecular weight).

*Example II*

The isobutylene polymer obtained in oil solution in the process described in Example I may also be obtained in a solid, oil free state, by suitable modifications of that process. For example, the reaction mixture, consisting of a solution of the isobutylene polymer in liquid butane, with some unreacted isobutylene, traces of catalyst products and refrigerant, is mixed with lime simply by adding a slurry of lime in liquid butane directly to this mixture with vigorous agitation. The resulting mixture with lime is heated under the pressure generated by the liquid to a temperature of 150 to 200° F. and is pumped without release in pressure through a filter press in which all solid material is filtered out. The filtrate is then passed through a heated coil in which it is heated to a temperature of 300 to 350° F. It is then passed with release of pressure into a flash drum in which the butane and other volatile products are separated as vapor from the isobutylene polymer, which is withdrawn from the bottom of the flash vessel as a highly viscous polymer of high quality, having an average molecular weight of about 15,000.

If the addition of lime is omitted in this process, the isobutylene polymer resulting contains considerable amounts of low molecular weight polymers, such as di-isobutylene and tri-isobutylene. Furthermore, the polymer is relatively unstable with regard to color, although as discharged from the flash chamber it may be light amber to water white in color. Colors varying from pink to dark brown develop upon standing for a short time. In contrast with this, the product obtained when adding lime is free of di-isobutylene and tri-isobutylene, is water white in color and has good color stability.

Two samples of the isobutylene polymer prepared by the above described method, one with and one without the addition of lime, were placed in an oven maintained at 100 to 125° C. The polymer prepared without the use of lime became dark brown in color after standing about 12 hours, whereas the other sample retained its water white appearance after standing for 120 hours in the same oven. It was also entirely free of odor at the end of this test.

*Example III*

A reaction vessel supplied with a heavy kneader of the Werner-Pfleiderer type is charged with pure liquid isobutylene and chilled by addition of solid carbon dioxide to a temperature of —75° F. Boron fluoride is then slowly added with additional solid carbon dioxide to maintain this temperature until the reaction is completed. A vigorous polymerization ensues, the entire contents of the reaction vessel being transformed to a solid rubber-like material. A small quantity of lime, approximately one-half percent by weight of the polymer, is mixed thoroughly with the polymer product while kneading either in the original reaction vessel or in a separate kneader to which it is transferred without opportunity to warm up more than a few degrees in temperature. After incorporation of the lime, the kneading is continued with addition of water and the product is permitted to warm up to about room temperature and is thoroughly washed with water. The water is then drained off and the kneader is heated to a temperature of about 300° F. Kneading is continued at this temperature until the water is substantially completely eliminated and a clear, dry product is obtained.

The above type of operation is particularly adapted to the preparation of polymers of high molecular weight of the order of 60,000 to 70,000 or higher. It has been observed heretofore that the washing and drying operation conducted without the addition of lime involved degradation in quality of the polymer and a reduction in viscosity index of the original polymer from a molecular weight of 60,000 to 70,000 to approximately 50,000. When the washing and drying operation is conducted as described in this example, after incorporation of lime with the cold polymer, there is no degradation in quality or decrease in molecular weight and high quality polymers having a molecular weight of 60,000 to 70,000 are obtained as the finished product.

The high molecular weight polymers produced as described in this example are often blended in amounts of 5 to 10% with light petroleum lubricating oils to produce viscous and stringy lubricants especially adapted for chassis lubrication. The blending operation is carried out into a dough-mixer type of kneading machine, the high molecular weight polymer being placed in the machine, the kneading started and then the oil being added very slowly. It has been observed that when the polymer is finished as described above without the addition of lime, a pronounced color develops during this blending operation and a blended lubricant of very poor color results. However, the polymer prepared with the use of lime as described above has none of these objections but blends with the lubricating oils to produce a blended lubricant having a bright, clear and light color equivalent to that of the initial oil used.

Other alkaline agents may be used in place of the lime described in the above examples, although lime ($Ca(OH)_2$) has been found to be preferable. Sodium carbonate is satisfactory in many instances but lubricants containing the resulting product tend to deposit sludge as evidenced by the Sligh test. Sodium hydroxide may also be used but its reaction with carbon dioxide involves serious loss of this refrigerant. Sodium oxide and the corresponding oxides, hydroxides and carbonates of potassium and of ammonium, as well as ammonia itself, may be used, also mixtures of such compounds, for example, soda lime. While the alkaline reacting agents have been added either in the dry state or in slurries with hydrocarbon oils in the above examples, they may also be made into a slurry or solution with water or other suitable preferably volatile diluents which may be separated from the polymer during the finishing operations. While the proportions of alkali to polymer shown in the above examples will in general be found sufficient, this may be varied widely within the scope of this invention. The use of an excess of alkali is not generally harmful, while proportions less than the optimum give correspondingly less favorable results. For example, if too little lime is added, the removal of the acidic properties will not be complete and poisons will accumulate so that after operation for some time under recycle conditions, the quality of the product will not be satisfactory. The proper amount of alkali may readily be determined by testing the product, after addition of the alkali, for alkalinity, from time to time with a suitable indicator such as methyl red. If the product is found to be acid, more alkali is added.

Isobutylene is polymerized at the low temperatures described above to linear type non-asphaltic hydrocarbon polymers of high molecular weight. At high temperatures approaching room temperature the same catalysts promote the formation of low molecular weight polymerization products such as di-isobutylene and tri-isobutylene. These polymers not only resist polymerization to the desired high molecular weight products but, if permitted to accumulate in recycle operation, act as poisons and seriously reduce the yield and quality of the high molecular weight polymers. It has accordingly been already proposed to prevent the polymerization of residual isobutylene by quenching the reaction mixture with water, steam or other material suitable for hydrolyzing the catalysts and destroying their polymerization activity. However, even such operation still results in the relatively inferior products of the comparative tests, without addition of alkali, described in the above examples. The following explanation is offered of the function of the alkali in the process of this invention.

In an ordinary isobutylene polymerization process in which the reaction product is hydrolyzed with steam to decompose residual boron fluoride and thereby to stop the polymerization, it was found that the recycle gases contained a considerable amount of oxygenated products such as alcohols and ethers. These materials are effective poisons which inhibit the formation of the desired high molecular weight polymers. It is believed that boron fluoride hydrolyzes to produce both boric acid and hydrofluoric acid:

$$BF_3 + H_2O = H_3BO_3 + HF$$

The hydrofluoric acid forms alkyl fluoride with olefins:

$$C_4H_8 + HF = C_4H_9F$$

As the temperature is raised this fluoride is hydrolyzed to form alcohol:

$$C_4H_9F + H_2O = C_4H_9OH + HF$$

This alcohol is known to be a poison. Further probable reactions are:

$$C_4H_9OH + C_4H_8 \xrightarrow{BF_3} C_4H_9OC_4H_9$$

This ether is also known to be a poison. Not only do these products poison the reaction but they cause an excessive consumption of boron fluoride:

$$C_4H_9OC_4H_9 + BF_3 = C_4H_9OC_4H_9.BF_3$$

Thus, for each mol of ether present, one mol of boron fluoride is consumed and is not available for further catalytic action.

It is believed that the addition of alkali in the present process serves to neutralize the hydrofluoric acid and to prevent the above described reactions which are believed to follow its formation.

While the amount of alkali to produce most favorable results will be found to vary in different processes, substantial benefits are obtained when adding even small amounts of alkali and it is in general sufficient to add merely enough alkali to render the polymerization product substantially neutral. An excess of alkali above this amount is unnecessary and should be avoided unless steps are taken in the finishing operation to remove it from the product. For example, if residual solid alkali such as lime is present it may be converted to the soluble salt by addition of a suitable acid such as hydrochloric acid and then washed out with water.

This invention is not to be limited to any specific examples or theoretical explanations, all of which have been presented herein solely for purpose of illustration, but is to be limited only by the following claims in which it is desired to claim all novelty in so far as the prior art permits.

We claim:

1. In the preparation of non-asphaltic linear type polymers of high molecular weight by polymerization of isoolefins with a metallic halide Friedel-Crafts catalyst at a temperature below about −10° F., a method of securing improved polymerization products comprising contacting the polymerization products resulting from this process with an alkali mixed with a hydrocarbon oil before the temperature of the polymerization products is permitted to rise above about −10° F.

2. Process according to claim 1 in which the said alkali is a solid alkaline reacting compound.

3. Process according to claim 1 in which the said alkali is calcium oxide.

4. Process according to claim 1 in which the said alkali is calcium hydroxide.

5. Process according to claim 1 in which the polymerization products are contacted with a hydrolyzing agent and an alkali before the temperature of the said products is permitted to rise above about −10° F.

6. Process according to claim 1 in which the said polymerization products are contacted with lime before the temperature of the said products is permitted to rise above about −10° F.

7. Process for preparing improved non-asphaltic linear type polymers of high molecular weight from isobutylene comprising bringing isobutylene into contact with boron fluoride at a temperature below about −20° F., maintaining the temperature of the reacting mixture continuously below about −20° F. until polymerization is substantially completed, then adding a hydrolyzing agent and an alkali mixed with a hydrocarbon oil to the reaction mixture while still holding the temperature thereof below −20° F., and then permitting the temperature of the resulting mixture to rise to about room temperature.

8. Process according to claim 7 in which the said alkali is calcium oxide.

9. Process according to claim 7 in which the said last mentioned mixture, after addition of the hydrolyzing agent and the alkali, is washed with water.

10. Process for preparing improved non-asphaltic linear type polymerization products of high molecular weight comprising bringing boron fluoride into contact with a solution of isobutylene in butane and at a temperature below about −20° F., maintaining the temperature of the resulting mixture continuously below −20° F. until polymerization is substantially completed, adding an alkali mixed with a hydrocarbon oil to the resulting butane solution of the polymerization products before the temperature is permitted to rise above about −20° F., then heating the resulting mixture under a pressure at least equal to its vapor pressure to a temperature of about 150 to 200° F., filtering the heated solution to remove solid matter, rapidly heating the filtrate to a temperature of about 300 to 350° F., then flashing the heated mixture to separate an unvaporized high molecular weight polymer from more volatile materials.

11. Process for preparing non-asphaltic linear type polymers of high molecular weight comprising bringing boron fluoride into contact with a solution of isobutylene in butane at a temperature maintained continuously below about −20° F., adding lime in the form of a slurry in the hydrocarbon oil to the resulting butane solution of the polymerization product after polymerization is substantially completed and before the temperature thereof is permitted to rise above about −20° F., heating the resulting mixture to a temperature of about 150 to 200° F. under a pressure at least equal to the vapor pressure of the liquid, flashing the heated mixture with added live steam into a flashing zone containing a petroleum lubricating oil and separately withdrawing from the said flashing zone vapors and a lubricating oil solution of the unvaporized polymerization products.

12. In the preparation of non-asphaltic linear type polymers of high molecular weight by polymerization of isoolefins with a metallic halide Friedel-Crafts catalyst at a temperature below about −10° F., a method of securing improved polymerization products comprising contacting the polymerization products resulting from this process with an alkali comprising a slurry of lime in a hydrocarbon liquid before the temperature of the polymerization products is permitted to rise above about −10° F.

13. Process for preparing improved non-asphaltic linear type polymers of high molecular weight from isobutylene comprising bringing isobutylene into contact with boron fluoride at a temperature below about −20° F., maintaining the temperature of the reacting mixture continuously below about −20° F. until polymerization is substantially completed, then adding a hydrolyzing agent and an alkali comprising a slurry of lime in hydrocarbon oil to the reaction mixture while still holding the temperature thereof below −20° F., and then permitting the temperature of the resulting mixture to rise to about room temperature.

14. In the preparation of linear type olefinic polymers of high molecular weight by the polymerization of isoolefins with a metallic halide Friedel-Crafts catalyst at a temperature below about −10° F., the method of securing improved polymers comprising the steps of treating the polymerization mixture from the polymerization process with an alkali before the temperature of the polymerization mixture is permitted to rise above about −10° F.

15. In the preparation of linear type olefinic polymers of high molecular weight by the polymerization of isoolefins with a metallic halide Friedel-Crafts catalyst at a temperature below about −10° F., the method of securing improved polymers comprising the steps of treating the polymerization mixture from the polymerization process with an aqueous alkali before the temperature of the polymerization mixture is permitted to rise above about −10° F.

16. In the preparation of linear type olefinic polymers of high molecular weight by the polymerization of isoolefins with a metallic halide Friedel-Crafts catalyst at a temperature below about −10° F., the method of securing improved polymers comprising the steps of treating the polymerization mixture from the polymerization process with an alkali comprising ammonia before the temperature of the polymerization mixture is permitted to rise above about −10° F.

17. In the preparation of linear type olefinic polymers of high molecular weight by the polymerization of isoolefins with a metallic halide Friedel-Crafts catalyst at a temperature below about −10° F., the method of securing improved polymers comprising the steps of treating the polymerization mixture from the polymerization process with an alkali comprising aqueous ammonia before the temperature of the polymerization mixture is permitted to rise above about −10° F.

18. In the preparation of linear type olefinic polymers of high molecular weight by the polymerization of isoolefins with a metallic halide Friedel-Crafts catalyst at a temperature below about −10° F., the method of securing improved polymers comprising the steps of treating the polymerization mixture from the polymerization process with a solid alkali before the temperature of the polymerization mixture is permitted to rise above about −10° F.

19. In the preparation of linear type olefinic polymers of high molecular weight by the polymerization of isoolefins with a metallic halide Friedel-Crafts catalyst at a temperature below about −10° F., the method of securing improved polymers comprising the steps of treating the polymerization mixture from the polymerization process with an alkali in water before the temperature of the polymerization mixture is permitted to rise above about −10° F.

20. In the preparation of linear type olefinic polymers of high molecular weight by the polymerization of isoolefins with a metallic halide Friedel-Crafts catalyst at a temperature below about −10° F., the method of securing improved polymers comprising the steps of treating the polymerization mixture from the polymerization process with an alkali comprising sodium carbonate before the temperature of the polymerization mixture is permitted to rise above about −10° F.

21. In the preparation of linear type olefinic polymers of high molecular weight by the polymerization of isoolefins with a metallic halide Friedel-Crafts catalyst at a temperature below about −10° F., the method of securing improved polymers comprising the steps of treating the polymerization mixture from the polymerization process with an alkali sodium carbonate solution before the temperature of the polymerization mixture is permitted to rise above about −10° F.

22. In the preparation of linear type olefinic polymers of high molecular weight by the polymerization of isoolefins with a metallic halide Friedel-Crafts catalyst at a temperature below about −10° F., the method of securing improved polymers comprising the steps of treating the polymerization mixture from the polymerization process with a solid alkali comprising lime before the temperature of the polymerization mixture is permitted to rise above about −10° F.

23. In the preparation of linear type olefinic polymers of high molecular weight by the polymerization of isoolefins with a metallic halide Friedel-Crafts catalyst at a temperature below about −10° F., the method of securing improved polymers comprising the steps of treating the polymerization mixture from the polymerization process with a solid alkali comprising lime slurry in water before the temperature of the polymerization mixture is permitted to rise above about −10° F.

24. In the preparation of linear type olefinic polymers of high molecular weight by the polymerization of substantially pure isobutylenic material by the application thereto of an active halide Friedel-Crafts catalyst at a temperature below about −10° F., the method of securing improved polymers comprising the steps of treating the polymerization mixture from the polymerization process with an alkali before the temperature of the polymerization mixture is permitted to rise above about −10° F.

25. In the preparation of linear type olefinic polymers of high molecular weight by the polymerization of substantially pure isobutylene with an active halide Friedel-Crafts catalyst at a temperature below about −10° F., the method of securing improved polymers comprising the steps of treating the polymerization mixture from the polymerization process with a neutralizing alkali comprising ammonia before the temperature of the polymerization mixture is permitted to rise above about −10° F.

26. In the preparation of linear type olefinic polymers of high molecular weight by the polymerization of isoolefins with a metallic halide Friedel-Crafts catalyst at a temperature below about −10° F., the method of securing improved polymers comprising the steps of treating the polymerization mixture from the polymerization process with a solid alkali before the temperature of the polymerization mixture is permitted to rise above about −10° F., and thereafter filtering the solid from the polymer.

MATTHEW D. MANN, Jr.
LUTHER B. TURNER.